United States Patent
Rydkin et al.

(10) Patent No.: US 11,827,074 B2
(45) Date of Patent: Nov. 28, 2023

(54) TRANSPORT REFRIGERATION UNIT ARCHITECTURE AND CONTROLS FOR SMART GRID OPTIMIZATION AND INTEGRATION

(71) Applicant: Carrier Corporation, Palm Beach Gardens, FL (US)

(72) Inventors: Ivan Rydkin, Rochester, NY (US); Robert A. Chopko, Baldwinsville, NY (US); Craig Drew Bogli, Avon, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 616 days.

(21) Appl. No.: 16/619,867

(22) PCT Filed: Jun. 6, 2018

(86) PCT No.: PCT/US2018/036282
§ 371 (c)(1),
(2) Date: Dec. 5, 2019

(87) PCT Pub. No.: WO2018/226848
PCT Pub. Date: Dec. 13, 2018

(65) Prior Publication Data
US 2020/0106271 A1 Apr. 2, 2020

Related U.S. Application Data

(60) Provisional application No. 62/516,258, filed on Jun. 7, 2017.

(51) Int. Cl.
*B60H 1/00* (2006.01)
*B60H 1/32* (2006.01)
(Continued)

(52) U.S. Cl.
CPC ....... *B60H 1/00428* (2013.01); *B60H 1/3232* (2013.01); *B60K 16/00* (2013.01);
(Continued)

(58) Field of Classification Search
CPC ........ H02J 3/32; H02J 3/36; H02J 7/35; H02J 2003/365; B60H 1/00428; B60H 1/3232;
(Continued)

(56) References Cited

U.S. PATENT DOCUMENTS 7,338,335 B1  3/2008  Messano
7,590,472 B2  9/2009  Hakim et al.
(Continued)

FOREIGN PATENT DOCUMENTS

CN   102792547 A   11/2012
CN   102826309 A   12/2012
(Continued)

OTHER PUBLICATIONS

Galeon, Soon, Tesla Cars Could Power the Grid (and Our Homes), online retrieved, URL <https://futurism.com/soon-tesla-cars-could-power-the-grid-and-our-homes/>, 4 pages.
(Continued)

*Primary Examiner* — Carlos Amaya
(74) *Attorney, Agent, or Firm* — CANTOR COLBURN LLP (57) ABSTRACT

A transport refrigeration unit (TRU) system (IO) is provided. The TRU system includes a TRU (30), an electrical grid and a control unit. The TRU (30) is configured to be operably coupled a container (20) and includes components configured to control an environment within an interior of the container (20) and a TRU battery pack (40) configured to store energy for powering at least the components. The control unit is communicative with the TRU (30) and the electrical grid and is configured to manage power supplies
(Continued)

and demands between the TRU battery pack (40) of each TRU (30) and the electrical grid.

20 Claims, 9 Drawing Sheets

(51) Int. Cl.
| | | |
|---|---|---|
| *B60P 3/20* | (2006.01) | |
| *H02J 3/36* | (2006.01) | |
| *H02J 7/35* | (2006.01) | |
| *B60K 16/00* | (2020.01) | |
| *H02J 3/32* | (2006.01) | |

(52) U.S. Cl.
CPC ............... *B60P 3/20* (2013.01); *H02J 3/322* (2020.01); *H02J 3/36* (2013.01); *H02J 7/35* (2013.01); *B60K 2016/003* (2013.01); *B60Y 2200/142* (2013.01); *H02J 2003/365* (2013.01); *H02J 2310/40* (2020.01)

(58) Field of Classification Search
CPC ..... B60K 16/00; B60K 2016/003; B60P 3/20; B60Y 2200/142
See application file for complete search history.

(56) References Cited

U.S. PATENT DOCUMENTS

| | | | |
|---|---|---|---|
| 7,783,390 B2 | 8/2010 | Miller | |
| 8,295,950 B1* | 10/2012 | Wordsworth | B60L 1/003 |
| | | | 700/297 |
| 8,723,344 B1* | 5/2014 | Dierickx | F03G 7/08 |
| | | | 290/1 R |
| 8,922,056 B2 | 12/2014 | Thisted | |
| 10,899,192 B2* | 1/2021 | Larson | B60H 1/00014 |
| 2007/0282495 A1 | 12/2007 | Kempton et al. | |
| 2011/0196692 A1 | 8/2011 | Chazez, Jr. et al. | |
| 2011/0202418 A1 | 8/2011 | Kempton et al. | |
| 2013/0158725 A1 | 6/2013 | Anderson et al. | |
| 2013/0231808 A1* | 9/2013 | Flath | B60W 20/10 |
| | | | 903/903 |
| 2013/0263911 A1 | 10/2013 | Bryson | |
| 2014/0060097 A1 | 3/2014 | Perreault | |
| 2014/0116077 A1 | 5/2014 | Pierce et al. | |
| 2016/0241042 A1 | 8/2016 | Mammoli et al. | |

FOREIGN PATENT DOCUMENTS

| | | |
|---|---|---|
| CN | 104617590 A | 5/2015 |
| CN | 104167751 B | 5/2016 |
| DE | 4205331 C2 | 2/1997 |
| GB | 2499448 A1 | 8/2013 |
| WO | 2010002644 A1 | 1/2010 |
| WO | 2013121166 A2 | 8/2013 |
| WO | 2016100406 A1 | 6/2016 |

OTHER PUBLICATIONS

Geysen et al., "Application of Smart Energy Networks-Potential Flexibility of Reefers", e-harbours electric, 11 pages.
ISR/WO, dated Sep. 21, 2018, total 16 pages.
Shahan, "Tesla CTO JB Straubel On Why EVs Selling Electricity To The Grid Is Not As Swell As It Sounds", 2016, online retrieved, URL <https://cleantechnica.com/2016/08/22/vehicle-to-grid-used-ev-batteries-grid-storage/>, 6 pages.
Siemens, "Innovative Power Distribution for Ports & Harbors—Concept for Profitable and Safe Electric Power Distribution", Siemens AG, 2017, 30 pages.
Thermo King, "ThermoLite Solar Panels", 2016, 8 pages.
Office Action issued in Chinese Patent Application No. 201880051585.6; Application Filing Date Jun. 6, 2018; dated Feb. 2, 2023 (7 pages).

* cited by examiner

TRANSPORT REFRIGERATION UNIT ARCHITECTURE AND CONTROLS FOR SMART GRID OPTIMIZATION AND INTEGRATION

CROSS-REFERENCE TO RELATED APPLICATIONS

This application claims the benefit of PCT/US2018/036282 filed Jun. 6, 2018, which claims priority to U.S. Provisional Application No. 62/516,258 filed Jun. 7, 2017, which is incorporated herein by reference in its entirety.

BACKGROUND

The following description relates to transport refrigeration units and, more particularly, to transport refrigeration unit architecture and controls for smart grid optimization and integration.

Environmental concerns and regulations are causing a shift in the design of transport refrigeration units (TRUs) that will make these devices quieter and cleaner in operation. That is, TRUs will have reduced noise levels associated with their operations and will be quieter as a result. Meanwhile, particulates will be eliminated from diesel engines or TRU refrigeration circuits will be reconfigured to use natural refrigerants as primary working fluids to provide for cleaner results. It has been found that an effective way to achieve both quieter and cleaner TRU operation is through a replacement of a diesel engine, which has traditionally been the TRU power source, with a non-diesel energy storage device such as a battery.

BRIEF DESCRIPTION

According to one aspect of the disclosure, a transport refrigeration unit (TRU) system is provided. The TRU system includes a TRU, an electrical grid and a control unit. The TRU is configured to be operably coupled to a container and includes components configured to control an environment within an interior of the container and a TRU battery pack configured to store energy for powering at least the components. The control unit is communicative with the TRU and the electrical grid and is configured to manage power supplies and demands between the TRU battery pack of each TRU and the electrical grid.

In accordance with additional or alternative embodiments, the TRU further includes a solar panel operably coupled to at least the TRU battery pack.

In accordance with additional or alternative embodiments, the TRU further includes a TRU controller to which the control unit is communicatively coupled.

In accordance with additional or alternative embodiments, the TRU further includes a TRU controller and the control unit is a component of the TRU controller.

In accordance with additional or alternative embodiments, a capacity of the TRU battery pack is made available to the electrical grid by the control unit.

In accordance with additional or alternative embodiments, the availability of the capacity of the TRU battery pack is controlled by the control unit in accordance with a loading schedule.

In accordance with additional or alternative embodiments, the availability of the capacity of the TRU battery pack is controlled by the control unit in accordance with a current loading or cooling condition.

In accordance with additional or alternative embodiments, the availability of the capacity of the TRU battery pack is controlled by the control unit in accordance with current or predicted ambient conditions.

According to another aspect of the disclosure, a transport refrigeration unit (TRU) system is provided and includes one or more containers, a TRU operably coupled to each of the one or more containers, each TRU including components configured to control an environment within an interior of the corresponding container and a TRU battery pack configured to store energy for powering at least the components, an electrical grid and a control unit. The control unit is communicative with the TRUs and the electrical grid and is configured to manage power supplies and demands between the TRU battery pack of each TRU and the electrical grid.

In accordance with additional or alternative embodiments, the one or more containers are stowed.

In accordance with additional or alternative embodiments, each TRU further includes a solar panel operably coupled to at least the corresponding TRU battery pack.

In accordance with additional or alternative embodiments, each TRU further includes a TRU controller.

In accordance with additional or alternative embodiments, the control unit is communicatively coupled to the TRU controller.

In accordance with additional or alternative embodiments, the control unit is distributed throughout each TRU controller.

In accordance with additional or alternative embodiments, a capacity of one or more TRU battery packs is made available to the electrical grid by the control unit.

In accordance with additional or alternative embodiments, the availability of the capacity of the one or more TRU battery packs is controlled by the control unit in accordance with a loading schedule.

In accordance with additional or alternative embodiments, the availability of the capacity of the one or more TRU battery packs is controlled by the control unit in accordance with a current loading or cooling condition.

In accordance with additional or alternative embodiments, the availability of the capacity of the one or more TRU battery packs is controlled by the control unit in accordance with current or predicted ambient conditions.

According to yet another aspect of the disclosure, a method of operating a transport refrigeration unit (TRU) system is provided. The method includes stowing one or more containers, operably coupling a TRU to each of the one or more containers, each TRU including components configured to control an environment within an interior of the corresponding container and a TRU battery pack configured to store energy for powering at least the components, providing a control unit in communication with the TRU and an electrical grid and managing power supplies and demands between the TRU battery pack of each TRU and the electrical grid.

In accordance with additional or alternative embodiments, the managing includes making a capacity of one or more TRU battery packs available to the electrical grid by the control unit in accordance with one or more of a loading schedule, a current loading or cooling condition and current or predicted ambient conditions.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

As will be described below, a non-diesel energy storage device (ESD) is used to provide power to a transport refrigeration unit (TRU) for a trailer having a single compartment or multiple compartments. The ESD includes a controller which communicates with a controller of the TRU to determine an energy need of the TRU and controls the ESD to provide energy to the TRU in accordance with the energy need.

With reference to FIGS. 1-5, a TRU system 10 is provided for use with a container 20 that is pulled by a cab 21 that may be powered by a diesel engine 22 or any other type of fossil fuel burning engine. The TRU system 10 includes a TRU 30, an ESD 40, a communication network 50 and a power network 60. Both the TRU 30 and the ESD 40 are communicatively coupled to the communication network 50. Similarly, both the TRU 30 and the ESD 40 are communicatively coupled to the power network 60.

Figure 1:
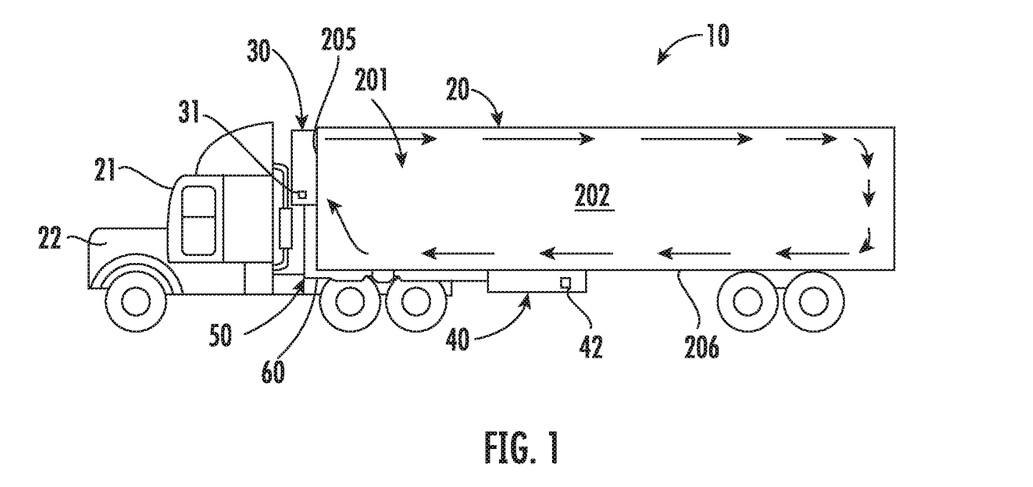
FIG. 1 is a side view of a transport refrigeration unit (TRU) for use with a container formed to define a single compartment in accordance with embodiments.
Figure 2:
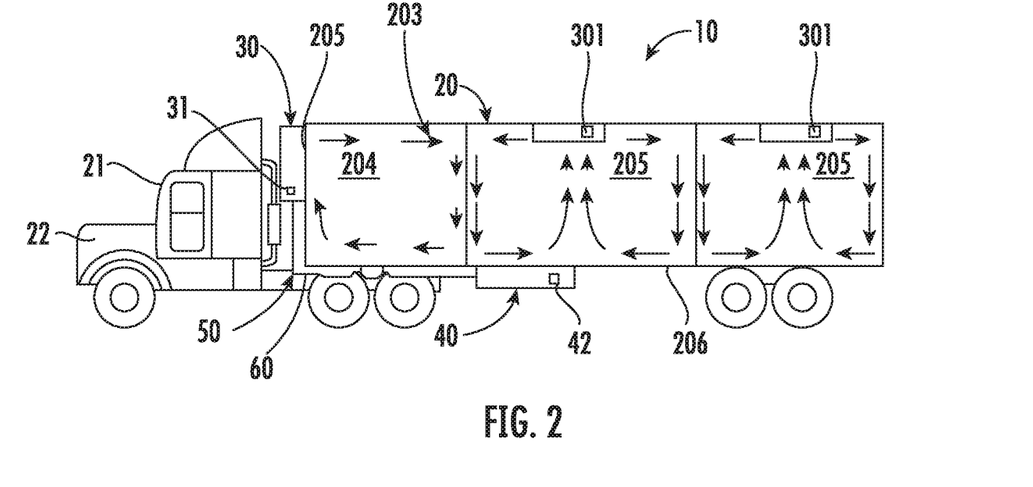
FIG. 2 is a side view of a TRU for use with a container formed to define multiple compartments in accordance with embodiments.
Figure 3:
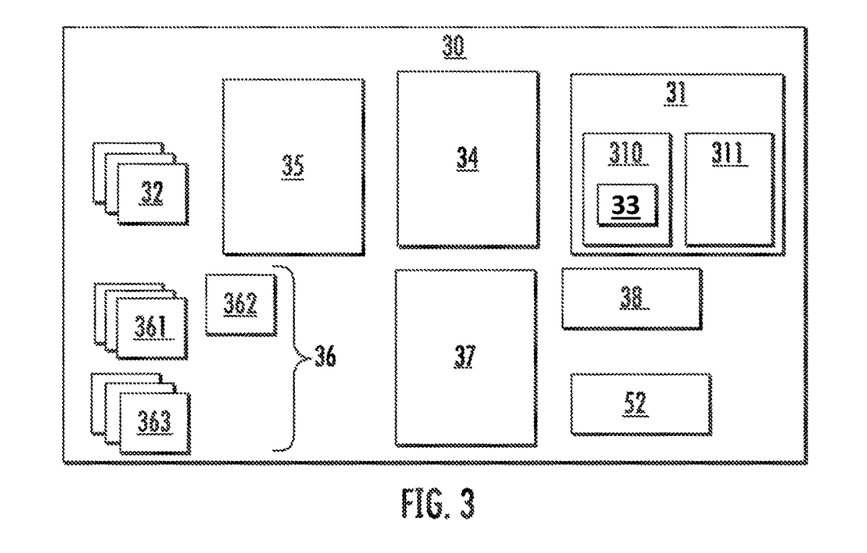
FIG. 3 is a schematic diagram illustrating components of a TRU in accordance with embodiments.

In accordance with embodiments and, shown in FIG. 1, the container 20 may be formed to define an interior 201 with a single compartment 202. In such a case, an interior temperature and other environmental conditions of the single compartment are controllable by various operations of the TRU 30. In accordance with alternative embodiments and, as shown in FIG. 2, the container 20 may be formed to define an interior 203 with a proximal compartment 204 and remote compartments 205. In such cases, the interior temperatures and other environmental conditions of the proximal compartment are controllable by various operations of the TRU 30 while the interior temperatures and other environmental conditions of the proximal compartment are respectively controllable by various operations of remote TRUs 301. The remote TRUs may be operable dependently or independently of the TRU 30. In any case, the container 20 may further include a plurality of various sensors to measure and monitor environmental conditions therein. These sensors can be configured to transmit sensing data to the TRU 30 as part of a feedback control loop As shown in FIG. 3, the TRU 30 (and the remote TRUs 301, where applicable) includes a TRU controller 31 and various components 32 that are disposed and configured for controlling environmental conditions within the container 20 (e.g., a compressor, an evaporator, a fan, etc.). The TRU controller 31 may include a processor 310 and a memory unit 311 having executable instructions stored thereon, which, when executed, cause the processor 310 to at least be receptive of control data 33 along with sensing data from the sensors of the container 20. The control data 33 is configured to be reflective of temperature profiles of the single compartment 202 or the proximal compartment 204 and the remote compartments 205 in the container 20. When executed, the executable instructions may further cause the processor 310 to operate the various components 32 of the TRU 30 in accordance with the control data 33 so as to maintain respective container interior temperatures that are as close as possible to the temperature profiles of the one or more compartments in the container 20.

Figure 8:
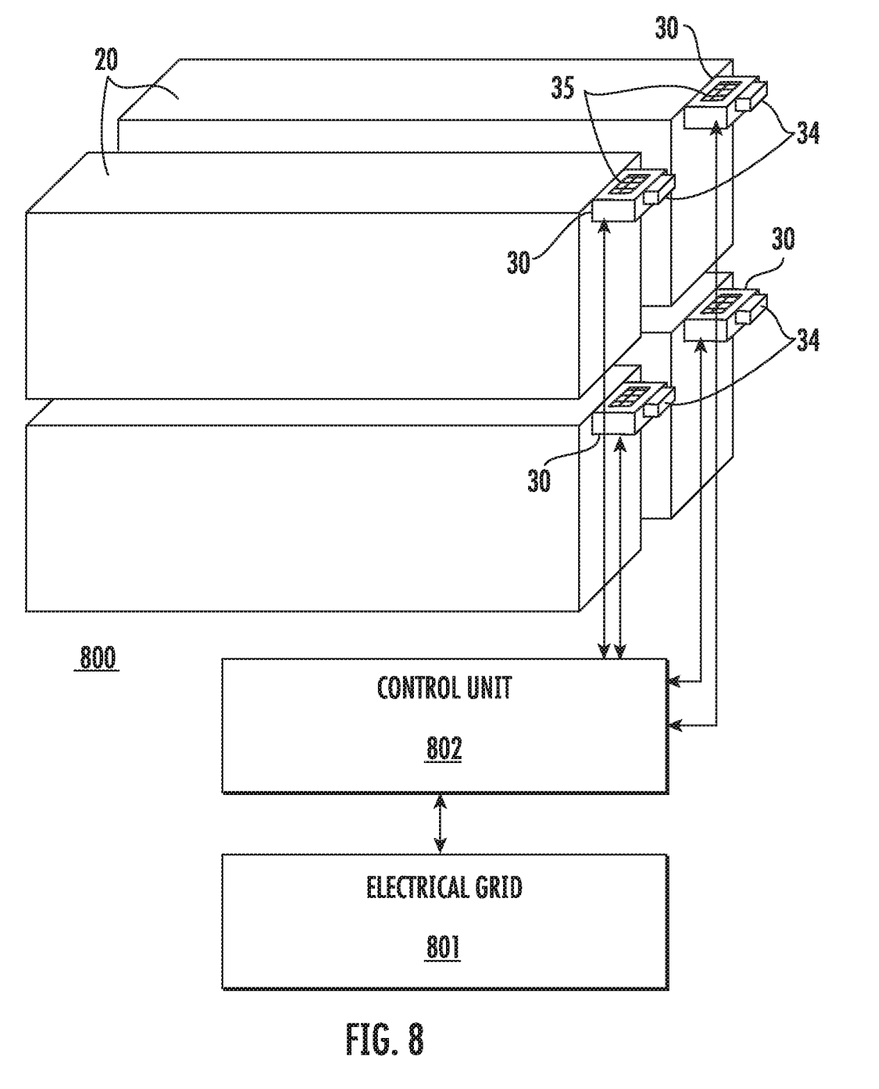
FIG. 8 is a schematic illustration of multiple containers in a warehoused condition.

In accordance with additional embodiments, each TRU 30 may further include a TRU battery pack 34 and a solar panel 35 (see FIG. 8). The TRU battery pack 34 is available for use by at least the TRU controller 31 for operating the various components 32 as need be on at least a limited basis. The solar panel 35 is disposed and configured to generate electrical power from collecting sunlight and may be disposed on an upper surface of the TRU 30.

In accordance with still further embodiments and, as shown in FIG. 3, the TRU 30 may also include a plurality of sensors 36, an input/output (I/O) interface 37 and a timer 38. The plurality of sensors 36 may include compressor discharge and suction pressure and temperature sensors 361, evaporator leaving temperature sensors 362 and supply, return and ambient air temperature sensors 363. The I/O interface 37 is disposed such that the TRU controller 31 is receptive of readings from the plurality of sensors 36 via the I/O interface 37. The timer 38 is configured to timestamp the readings of the plurality of sensors 36. In addition, in these or other cases, the memory unit 311 may be configured to additionally store component identification data, which may be provided as model numbers for each of the various components 32, for example, the readings of the plurality of sensors 36, which is recordable as current condition data, and control data. The control data may include a temperature set point instruction as well as a ±Δ temperature range instruction.

Figure 4:
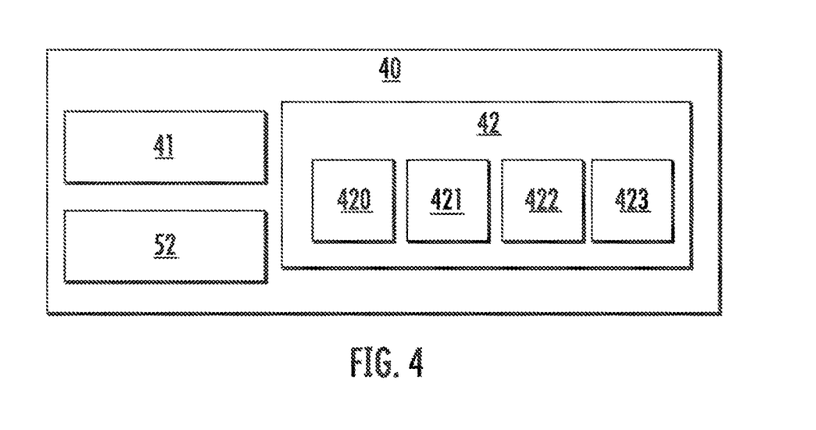
FIG. 4 is a schematic diagram illustrating components of an energy storage device (ESD) in accordance with embodiments.

As shown in FIGS. 1, 2 and 4, the ESD 40 is separate and distinct from the diesel engine 22 and may include a battery or, more particularly, a rechargeable battery 41 and an ESD controller 42. The ESD controller 42 may include a processor 420, a memory unit 421 having executable instructions stored thereon and an I/O interface 422 by which communications to and from the processor 420 proceed. When executed, the executable instructions cause the processor 420 to perform the following operations. For example, when executed, the executable instructions cause the processor 420 to determine an energy need of the TRU 30 to comply with the control data 33 from communications between the ESD controller 42 and the TRU controller 31 via the communication network 50. As another example, when executed, the executable instructions cause the processor 420 to control the ESD 40 to provide energy to the TRU 30 in accordance with the energy need via the power network 60.

In accordance with further embodiments, the executable instructions, when executed, may also cause the processor 420 to identify an additional load 423 which may be coupled to or applied to the ESD 40, to determine that this additional load 423 has an additional energy need and to control the ESD 40 to provide energy to the additional load 423 in accordance with the additional energy need.

The ESD 40 will also allow for export of power to external devices other than the TRU 30. For example, external loads such as lights, lift gates, etc. could be powered from or by the ESD 30 under the control of the ESD controller 42 possibly in conjunction with the TRU controller 31. The TRU 30 may take priority for power use to maintain temperature controls unless otherwise specified.

Figure 5:
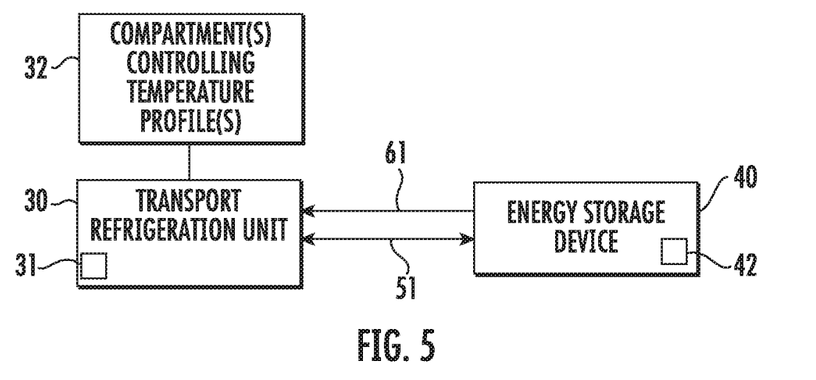
FIG. 5 is a schematic diagram illustrating communications between a TRU and an ESD in accordance with embodiments.

In accordance with embodiments and, as shown in FIGS. 1, 2 and 5, the TRU 30 may be supportively disposable on a side or front wall 205 of the container 20 and the ESD 40 may be supportively disposable on an underside 206 of the container 20. In these or other cases, the communication and power networks 50 and 60 may respectively include wiring 51 and 61 that are respectively routable along an exterior (i.e., along the underside 206 and the front wall 205) of the container 20. The wiring 51 and 61 will be sized, insulated and protected to communicate data with little or no interference or to conduct electrical power in various environmental conditions to which the TRU system 10 is exposed.

In accordance with alternative embodiments and, as shown in FIGS. 3 and 4, at least the communication network 50 may include a wireless communication pathway which is enabled by respective transmit/receive (T/R) modules 52 in the TRU controller 31 and the ESD controller 42. The power network 60 may also include at least a portion which is configured as a wireless network.

Figure 6:
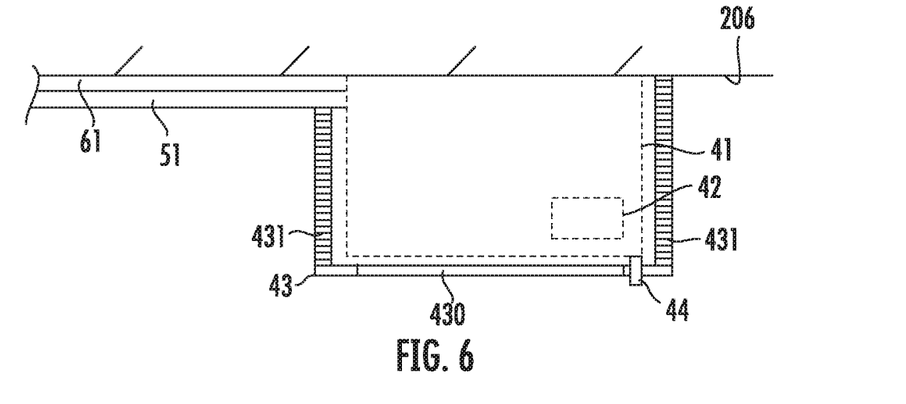
FIG. 6 is a schematic side view of a housing of an ESD in accordance with embodiments.

With reference to FIG. 6, the ESD 40 will be designed mechanically to withstand all vibration and shock seen in transport environments. This will include providing the ESD 40 with proper mounting that will prevent damage or inadvertent disconnection. To this end, the ESD 40 includes the battery or, more particularly, the rechargeable battery 41 and the ESD controller 42 and may also include a housing 43 for housing the rechargeable battery 41 and the ESD controller 42 as well as an external power input 44 by which current can be directed from an external source toward the rechargeable battery 41 for charging and recharging purposes. As shown in FIG. 6, the housing 43 is configured to protect the ESD 40 from environmental conditions, such as road debris, moisture and corrosion, and may include an access panel 430 by which a serviceman can access the ESD 40 for servicing or replacement and vents 431 for defining a coolant pathway along which airflow can be directed to cool the rechargeable battery 41.

In accordance with embodiments, the external source may be any one or more of an electrical grid (see, e.g., electrical grid 801 of FIG. 8), solar panels operably disposed on either containers 20 or TRUs 30 (see, e.g., the solar panels 35 of FIG. 8), another storage device or a power generation source. In any case, the external source will provide for supplemental power and/or restoration of power of the rechargeable battery 41. In addition, the external power input 44 may be connectable to the external power source by way of a receptacle. This receptacle may be user accessible, requires no tools to connect and may be protected against environmental conditions such as moisture, dust, etc.

Figure 7:
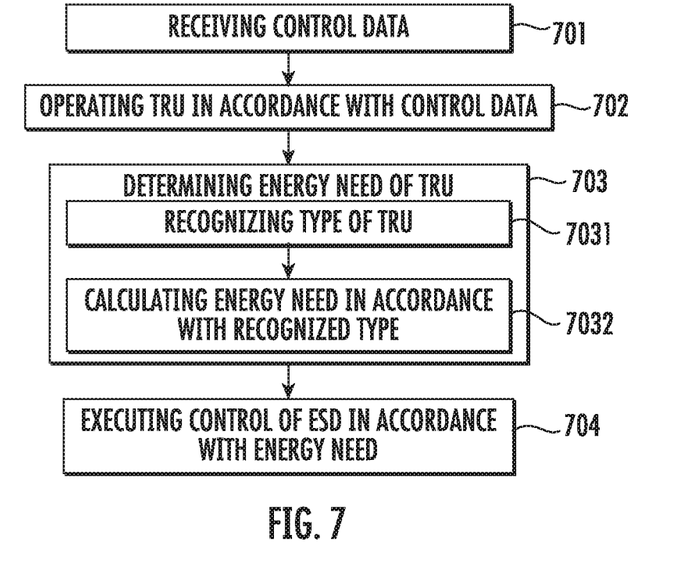
FIG. 7 is a flow diagram illustrating a method of operating a TRU system for use with a container pulled by a cab powered by a diesel engine in accordance with embodiments.

With reference to FIG. 7, a method of operating the TRU system 10 is provided. As shown in FIG. 7, the method includes receiving, at the TRU controller 31, the control data 33 (block 701) and operating the TRU 30 in accordance with at least the control data 33 (block 702). The method further includes determining, at the ESD controller 42, an energy need of the TRU 30 to comply with the control data 33 from communications between the TRU and ESD controllers 31 and 42 via the communications network 50 (block 703). In addition, the method includes executing control of the ESD 40 by the ESD controller 42 to provide energy to the TRU 30 in accordance with the energy need via a power network 60.

In accordance with embodiments, the determining of block 703 may include recognizing, at the ESD controller 42, a type of the TRU 30 from identification information transmitted from the TRU 30 or the TRU controller 31 to the ESD controller 42 (block 7031) and calculating, at the ESD controller 42, the energy need of the TRU 30 in accordance with the recognized type of the TRU 30 (block 7032).

The description provided above relates to systems and methods of operating a TRU using a non-diesel ESD to thus provide for quieter and cleaner overall TRU operation as compared to what is otherwise possible with a traditional diesel engine power source. The description is applicable to any TRU (trailer or truck units) using any refrigeration working fluid (e.g., R-404a, R-452a, R-744, carbon dioxide, etc.).

As will be described below, a control scheme and power architecture is provided to allow a TRU 30 to comply or communicate with grid demand depending on a current load profile and TRU use.

With reference back to FIG. 3 and with additional reference to FIG. 8, a transport refrigeration unit (TRU) system 800 is provided. As separately shown in FIGS. 3 and 8, the TRU system 800 includes containers 20, TRUs 30, an electrical grid 801 and a control unit 802. Each respective TRU 30 is operably coupled to a corresponding one of the containers 20 and is configured substantially as described above. That is, each TRU 30 includes the TRU controller 31, the various components 32 that are configured to control an environment within an interior of the corresponding container 20, the TRU battery pack 34 that is configured to store energy for powering at least the various components 32 and the solar panel 35. The electrical grid 801 may have multiple generators and loads electrically coupled thereto such that those multiple generators and loads are in turn coupled to the TRUs 30.

The control unit 802 is communicative with the TRU controllers 31 of each of the TRUs 30 and with the electrical grid 801 and is configured to manage power supplies and demands between the TRU battery pack 34 of each of the TRUs 30 and the electrical grid 801. The control unit 802 may be remote from and communicatively coupled with the TRU controllers 31 or may be distributed throughout the TRU system 800 so as to be embodied in some or all of the TRU controllers 31.

In any case, a capacity of one or more of the TRU battery packs 34 is made available to the electrical grid 801 by the control unit 802. To this end, an availability of the capacity of the one or more TRU battery packs 34 is controlled by the control unit 802 in accordance with one or more of a loading schedule of each of the containers 20, a current loading or cooling condition of each of the containers 20 and current or predicted ambient conditions in and around each of the containers 20. That is, where the control unit 802 is embodied in some or all of the TRU controllers 31, the executable instructions of the memory unit 311 cause the processor 310 to determine at least one or more of a loading schedule of each of the containers 20, a current loading or cooling condition of each of the containers 20 and current or predicted ambient conditions in and around each of the containers 20 and to make a decision relating to an amount of power that can be provided to the electrical grid 801 from the TRU battery packs 34 without sacrificing performance accordingly.

For example, a TRU battery pack 34 of a TRU 30 of an empty container 20, which is stowed at a warehouse and which is not scheduled to be loaded for multiple days, can be employed to serve as a load leveling or energy arbitrage device for the electrical grid 801. As another example, where certain TRUs 30 are fitted with solar panels 35, the control unit 802 can prioritize the use of electrical power generated by those solar panels for battery charging purposes or grid sale based on at least one or more of a loading schedule of each of the containers 20, a current loading or cooling condition of each of the containers 20 and current or predicted ambient conditions in and around each of the containers 20.

Figure 9:
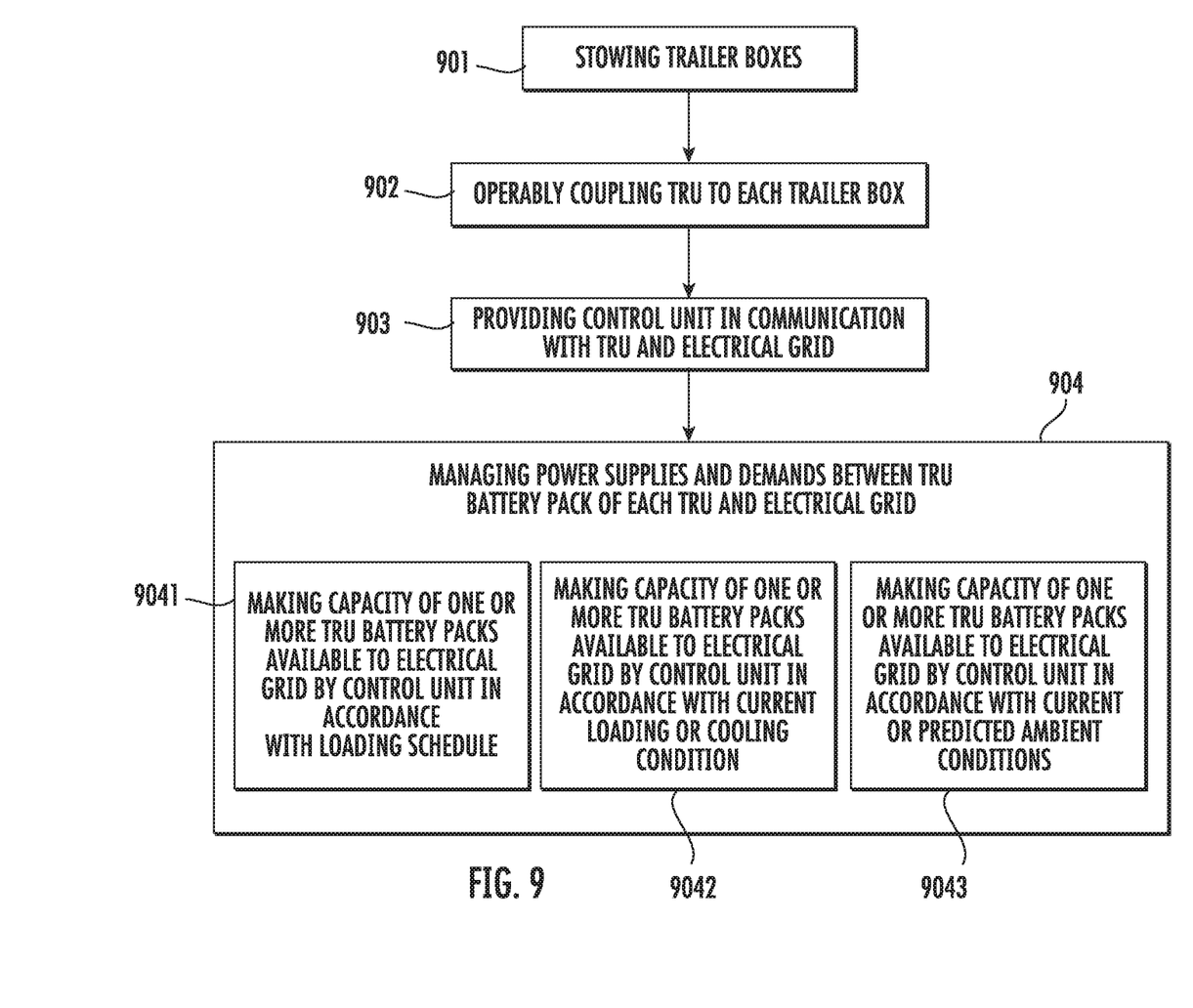
FIG. 9 is a flow diagram illustrating a method of operating a TRU system in accordance with embodiments.

With reference to FIG. 9, a method of operating a transport refrigeration unit (TRU) system is provided. As shown in FIG. 9, the method includes stowing one or more containers 20 (block 901), operably coupling a TRU 30 to each of the one or more containers 20 with each TRU 30 including the various components 32 configured to control an environment within an interior of the corresponding container 20 and a TRU battery pack 34 (block 902), providing a control unit 802 in communication with the TRU 30 and an electrical grid 801 (block 903) and managing power supplies and demands between the TRU battery pack 34 of each TRU 30 and the electrical grid 801 (block 904). Here, the managing of block 904 may include making a capacity of one or more TRU battery packs 34 available to the electrical grid 801 by the control unit 802 in accordance with one or more of a loading schedule (block 9041), a current loading or cooling condition (block 9042) and current or predicted ambient conditions (block 9043).

The description provided herein of smart grid integration allows for economic rebates and utility rebates. Smart communication and predictive load requirements can inform warehouse customers with regards to their expected peak energy requirements. Solar Panel fitted TRU's can sell energy during peak production hours over prioritizing battery and unit charging.

As will be described below, systems and methods of TRU control are provided for a non-diesel ESD, such as a battery pack, as determined by a controlling temperature profile of container cooling compartments. Here, component refrigeration controls are shifted from the traditional TRU controller to the ESD controller by setting refrigeration component operating settings in the ESD controller with consideration given to both the power needed to operate the various components of the TRU and the proper settings to meet TRU refrigeration needs as set by the controlling temperature profile(s). Once the settings are known, the information is passed back to the TRU controller and the TRU operates accordingly.

Figure 10:
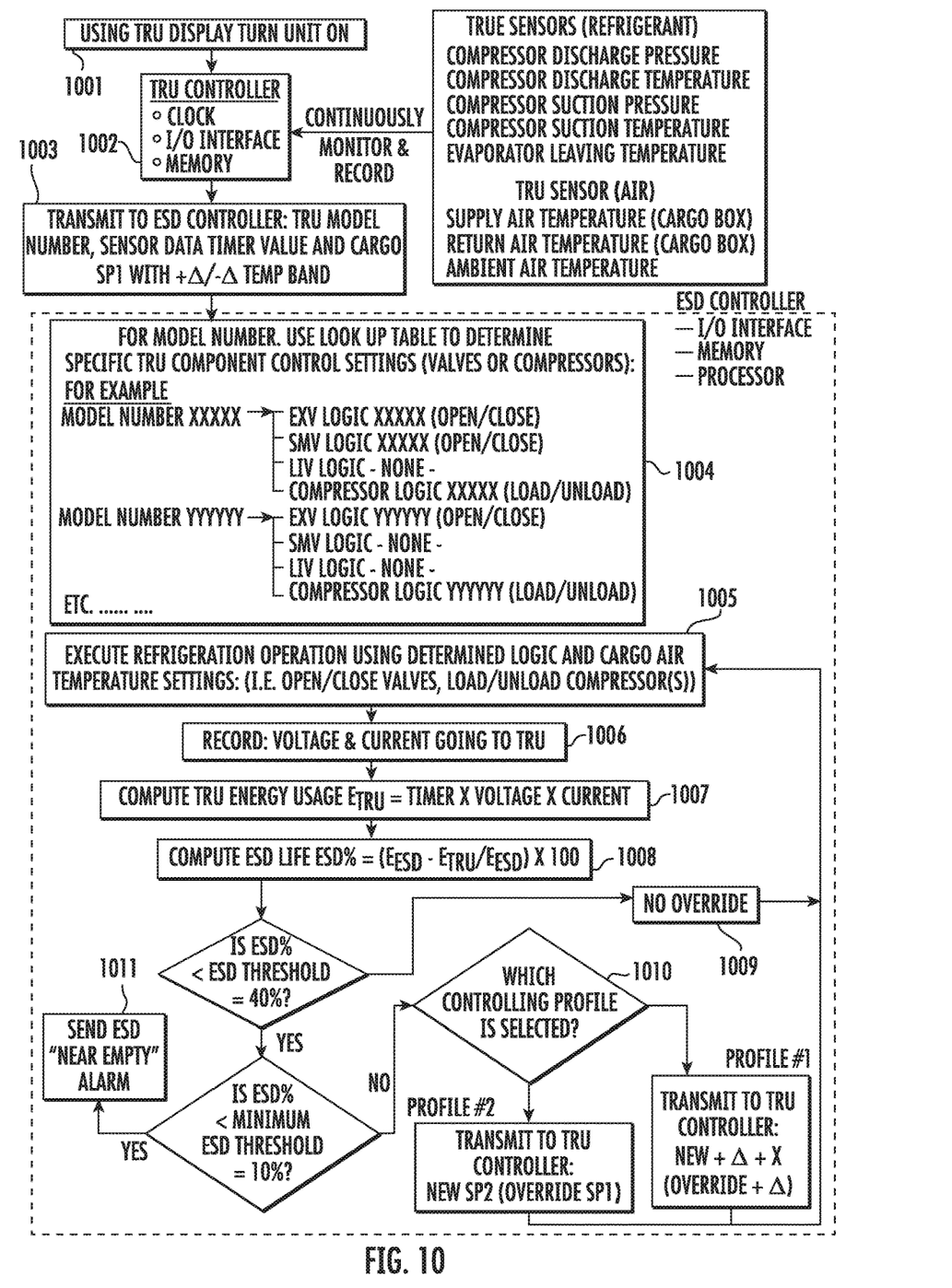
FIG. 10 is a flow diagram illustrating a method of operating a TRU system in accordance with embodiments.
Figure 11:
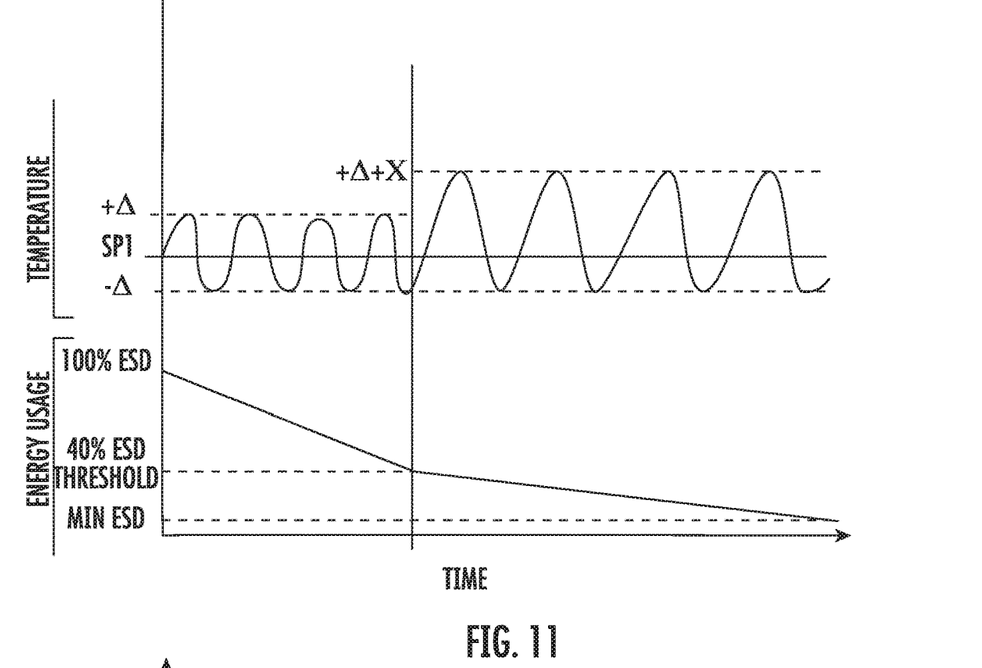
FIG. 11 is a graphical display of various temperature set points and ±Δ temperature ranges in accordance with embodiments.
Figure 12:
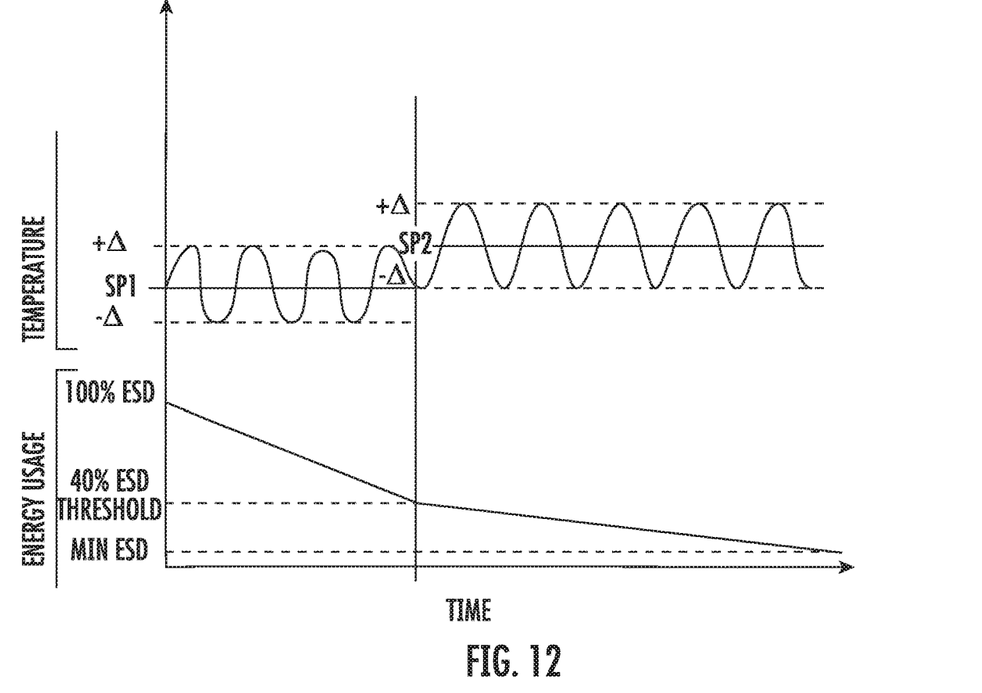
FIG. 12 is a graphical display of various temperature set points and ±Δ temperature ranges in accordance with embodiments.

Thus, with reference to FIGS. 10-12, a method of operating a transport refrigeration unit (TRU) system is provided and includes starting a TRU 30 such that the various components 32 control an environment of an interior of a container 20 with the TRU controller 31 controlling the various components 32 in accordance with component operating settings (block 1001). Subsequently, the TRU controller 31 collects current condition data that is reflective of current conditions of the interior of the container 20 from the plurality of sensors 36 (block 1002) and, with the TRU and the ESD controllers 31 and 42 being established, the TRU controller 31 transmits identification data identifying the various components 32, the current condition data and control data that is reflective of a temperature profile of the interior of the container 20 to the ESD controller 42 (block 1003). The ESD controller 42 then looks up component control settings of each of the various components 32 in accordance with the identification data (block 1004). At this point, the ESD controller 42 determines the component operating settings in accordance with the component control settings associated with the identification data as well as the current condition and control data and issues the component operating settings to the TRU controller 31 (block 1005).

In accordance with embodiments, the identification data may include model numbers of the various components 32, the current condition data may include compressor discharge and suction pressure and temperatures, evaporator temperatures and supply, return and ambient air temperatures and the control data may include a temperature set point instruction with a $\pm\Delta$ temperature band instruction.

Once the ESD controller 42 issues the component operating settings to the TRU controller 31, the ESD controller 42 calculates an energy need of the TRU 30 to operate according to the component operating settings and controls the ESD 40 to provide energy to the TRU 30 in accordance with the energy need while monitoring this energy usage by the TRU 30 by, for example, recording voltage and current supplied by the ESD 40 to the TRU 30 (block 1006). The ESD controller 42 then computes TRU energy usage over time (block 1007) and calculates ESD life in accordance with the monitored energy usage (block 1008).

The ESD controller 42 then takes an action based on the calculated ESD life. Such action may include making a decision not to override the control data in an event the ESD life is above a first threshold (block 1009), making a decision to override the control data in an event the ESD life is between a second and the first threshold (block 1010) and/or making a decision to issue an alarm in an event the ESD life is below the second threshold (block 1011). Here, in an event the ESD life is between a second and the first threshold and in an event the control data is consistent with a first control setting, the making of the decision to override the control data comprises changing a temperature set point value (see, e.g., the changing of SP1 to SP2 in FIG. 12). By contrast, in an event the ESD life is between a second and the first threshold and in an event the control data is consistent with a second control setting, the making of the decision to override the control data comprises changing a set point and range values (see, e.g., the changing of the $\pm\Delta$ temperature range value in FIG. 11 with or without an additional temperature set point change).

The description provided above relates to TRU operation of a non-diesel energy source that results in both quieter and cleaner overall TRU operations as compared to a traditional diesel power source and can be used with any TRU using any refrigeration working fluid.

As will be described below, methods of TRU energy control are provided for a non-diesel ESD and are determined by controlling temperature profiles of container cooling compartments.

Figure 13:
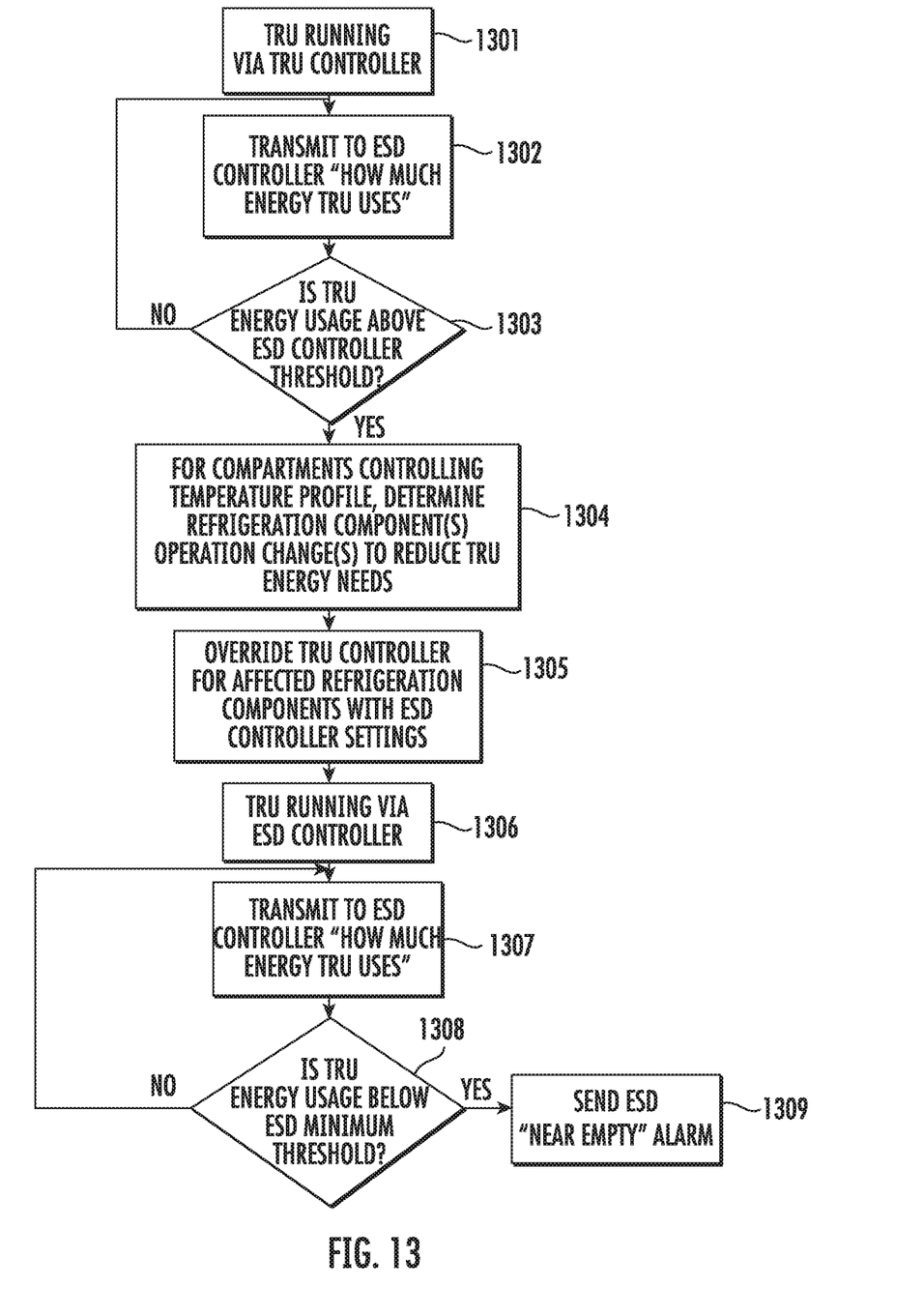
FIG. 13 is a flow diagram illustrating a method of operating a TRU system in accordance with embodiments.
Figure 14:
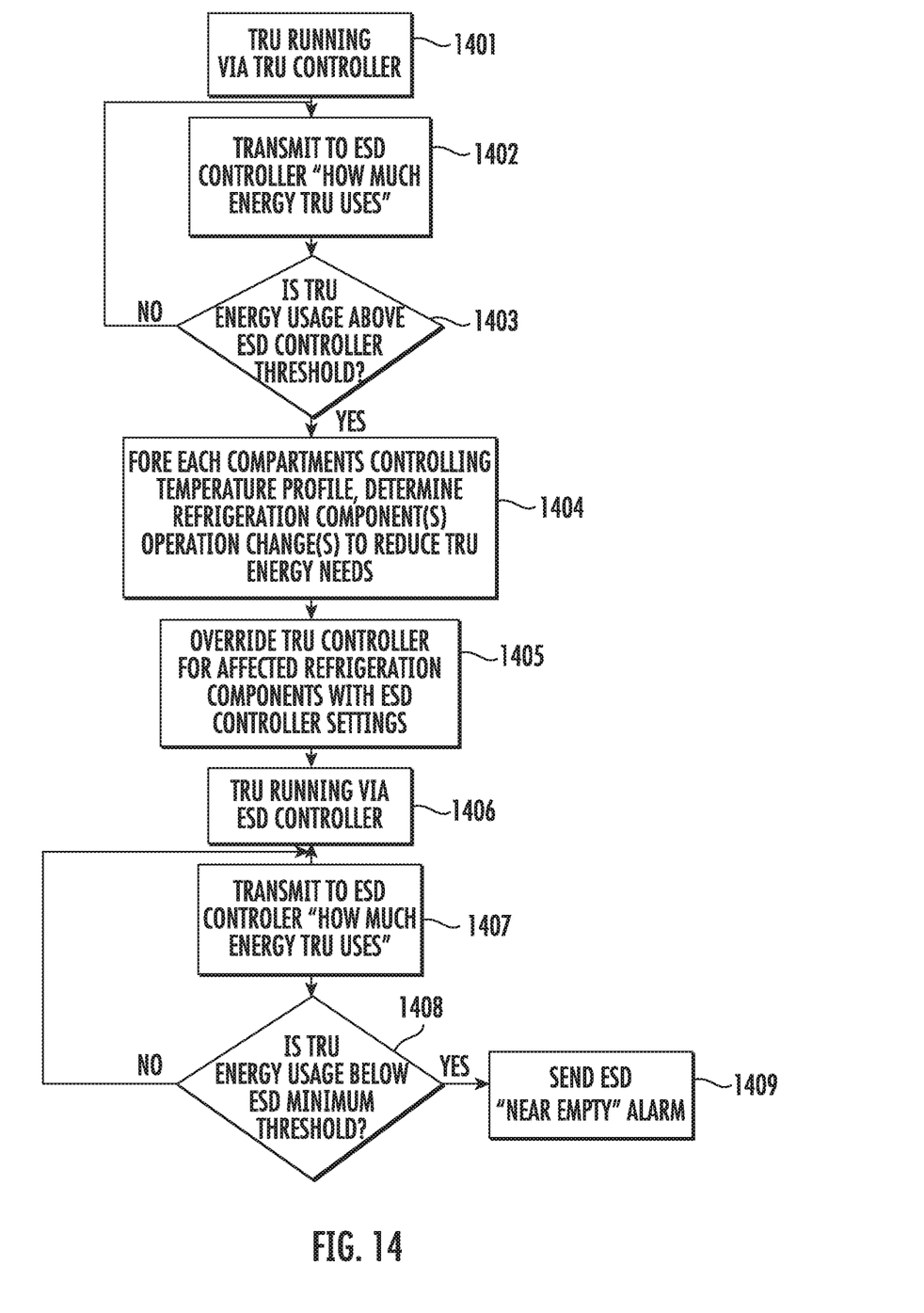
FIG. 14 is a flow diagram illustrating a method of operating a TRU system in accordance with embodiments.

With reference to FIGS. 13 and 14, the methods include controlling the various components 32 to control an environment in a single compartment interior as shown in FIG. 13 or to control environments in multiple compartment interiors as shown in FIG. 14 (blocks 1301 and 1401) and monitoring energy usage by the components being controlled in accordance with the initial control settings for transmission to the ESD controller 42 (blocks 1302 and 1402). The methods thus include determining whether the energy usage is above a threshold (blocks 1303 and 1403) and reverting to blocks 1302 and 1402 if not. On the other hand, in an event the energy usage is above the threshold, the methods further include identify operational changes for one or more of the components or for one or more of the components of each of the multiple compartment interiors to reduce the energy usage (blocks 1304 and 1404), overriding the initial control settings of the one or more of the components with new control settings (blocks 1305 and 1405) and operating the components in accordance with the new control settings (blocks 1306 and 1406).

As shown in FIGS. 13 and 14, the methods further include monitoring energy usage by the components being controlled in accordance with the new control settings for transmission to the ESD controller 42 (blocks 1307 and 1407), determining whether the energy usage is below a minimum threshold (blocks 1308 and 1408) and issuing an alarm in an event the energy usage is below the minimum threshold (blocks 1309 and 1409).

The description provided above relates to TRU operation of a non-diesel energy source that results in both quieter and cleaner overall TRU operations as compared to a traditional diesel power source and can be used with any TRU using any refrigeration working fluid While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A transport refrigeration unit (TRU) system, comprising:
   a TRU configured to be operably coupled to a container, the TRU comprising components configured to control an environment within an interior of the container and a TRU battery pack attached to the TRU and configured to store energy for powering at least the components;
   an electrical grid; and
   a control unit which is communicative with the TRU and the electrical grid and which is configured to manage power supplies and demands between the TRU battery pack of the TRU and the electrical grid,
   wherein the TRU further comprises a solar panel operably coupled to at least the TRU battery pack, and, for when the container is stowed, the control unit prioritizes the use of electrical power generated by the solar panel for charging or grid sale.

2. The TRU system according to claim 1, wherein for when the container is stowed at a warehouse, the control unit prioritizes the use of the electrical power generated by the solar panel for charging or grid sale based on a loading schedule, current loading or cooling conditions and current or predicted ambient conditions of the container.

3. The TRU system according to claim 1, wherein the TRU further comprises a TRU controller to which the control unit is communicatively coupled.

4. The TRU system according to claim 1, wherein the TRU further comprises a TRU controller, the control unit being a component of the TRU controller.

5. The TRU system according to claim 1, wherein a capacity of the TRU battery pack is made available to the electrical grid by the control unit.

6. The TRU system according to claim 5, wherein availability of the capacity of the TRU battery pack is controlled by the control unit in accordance with a loading schedule.

7. The TRU system according to claim 5, wherein availability of the capacity of the TRU battery pack is controlled by the control unit in accordance with a current loading or cooling condition.

8. The TRU system according to claim 5, wherein availability of the capacity of the TRU battery pack is controlled by the control unit in accordance with current or predicted ambient conditions.

9. A transport refrigeration unit (TRU) system, comprising:
   multiple containers;
   a TRU operably coupled to a corresponding one of each of the multiple containers, each of the TRUs comprising:
      components configured to control an environment within an interior of the corresponding container; and
      a TRU battery pack attached to the corresponding TRU and configured to store energy for powering at least the corresponding components;
   an electrical grid; and
   a control unit which is communicative with each of the TRUs and with the electrical grid,
   the control unit being configured to manage power supplies and demands between the TRU battery pack of each of the TRUs and the electrical grid.

10. The TRU system according to claim 9, wherein the multiple containers are stowed at a warehouse.

11. The TRU system according to claim 10, wherein:
   each of the TRUs further comprises a solar panel operably coupled to at least the corresponding TRU battery pack, and
   the control unit prioritizes the use of electrical power generated by each of the solar panels for charging or grid sale based on loading schedules, current loading or cooling conditions and current or predicted ambient conditions of each of the multiple containers.

12. The TRU system according to claim 9, wherein each of the TRUs further comprises a TRU controller.

13. The TRU system according to claim 12, wherein the control unit is communicatively coupled to the TRU controller of each of the TRUs.

14. The TRU system according to claim 12, wherein the control unit is distributed throughout each TRU controller of each of the TRUs.

15. The TRU system according to claim 9, wherein a capacity of the TRU battery packs of each of the TRUs is made available to the electrical grid by the control unit.

16. The TRU system according to claim 15, wherein availability of the capacity of the one or more TRU battery packs is controlled by the control unit in accordance with a loading schedule, a current loading or cooling condition and current or predicted ambient conditions.

17. A method of operating a transport refrigeration unit (TRU) system, the method comprising:
    stowing multiple containers;
    operably coupling a TRU to each of the multiple containers, each of the TRUs comprising:
        components configured to control an environment within an interior of the corresponding container; and
        a TRU battery pack attached to the corresponding TRU and configured to store energy for powering at least the components;
    providing a control unit in communication with each of the TRUs and an electrical grid; and
    managing power supplies and demands between the TRU battery pack of each of the TRUs and the electrical grid.

18. The method according to claim 17, wherein the managing comprises making a capacity of the TRU battery packs of each of the TRUs available to the electrical grid by the control unit in accordance with one or more of a loading schedule, a current loading or cooling condition and current or predicted ambient conditions.

19. The TRU system according to claim 9, wherein the components of each of the TRUs, which are configured to control an environment within an interior of the corresponding container, comprise: a compressor, an evaporator and a fan.

20. The method according to claim 17, wherein the components of each of the TRUs, which are configured to control an environment within an interior of the corresponding container, comprise: a compressor, an evaporator and a fan.

* * * * *